(12) United States Patent
McElderry (10) Patent No.: US 9,924,005 B1
(45) Date of Patent: Mar. 20, 2018

(54) UNIVERSAL PHONE MOUNTING APPARATUS (71) Applicant: CAM CADDIE, Alhambra, CA (US)

(72) Inventor: Daniel McElderry, Glendale, CA (US)

(*) Notice: Subject to any disclaimer, the term of this patent is extended or adjusted under 35 U.S.C. 154(b) by 0 days.

(21) Appl. No.: 15/417,082

(22) Filed: Jan. 26, 2017

(51) Int. Cl.
H04M 1/00 (2006.01)
H04B 1/38 (2015.01)
H04M 1/11 (2006.01)

(52) U.S. Cl.
CPC .................... H04M 1/11 (2013.01)

(58) Field of Classification Search
CPC .... H04M 1/04; H04M 1/0254; H04M 1/6041; H04M 1/6075; H04B 1/3822; H04B 1/3877; H04B 1/3888
USPC ............ 455/90.3, 569.1, 575.1, 575.8, 575.9
See application file for complete search history.

(56) References Cited

U.S. PATENT DOCUMENTS 5,903,645 A * 5/1999 Tsay .................... B60R 11/0241 379/455
6,085,113 A * 7/2000 Fan .................... B60R 11/0241 455/575.8
7,540,459 B2 * 6/2009 Asano ................. B60R 11/0241 379/455
7,551,458 B2 * 6/2009 Carnevali ........... B60R 11/0252 174/520
7,920,905 B2 * 4/2011 Bury .................... B60R 11/0241 455/575.1
9,108,096 B2 * 8/2015 Solheim ............. A63B 69/3632
9,701,256 B2 * 7/2017 Haymond ............... B60R 11/02
2016/0014243 A1 * 1/2016 Snowden ............ B60R 11/0241 455/575.1

* cited by examiner

Primary Examiner — Quochien B Vuong
(74) Attorney, Agent, or Firm — Cotman IP Law Group, PLC (57) ABSTRACT A universal mounting device is presented. The device includes a main clamp with a left and right vertical main posts, an inverted v-shaped clamp connecting the top ends of the main posts, and a handle bar connecting the bottom ends of the main posts. A compression spring resides inside a cavity in each main post. A bottom clamp with a v-shaped clamp base and a left and right bottom post is coupled to the main clamp via a pusher. The pusher has a horizontal handle and a vertical leg at opposing ends that couples the main clamp to the base clamp through the springs in the main posts to the bottom posts. Each vertical leg has a lower leg through a cavity in the spring and an upper leg that pushes on the spring. The pusher is secured with a nut coupler at the bottom post.

11 Claims, 14 Drawing Sheets

UNIVERSAL PHONE MOUNTING APPARATUS

BACKGROUND OF THE INVENTION

Field of the Invention

Embodiments of the present invention generally relate to a mounting device, and more particularly to a universal phone mounting apparatus for use with accessories and portable stands.

Description of the Related Art

Digital cameras have long surpassed traditional film cameras in popularity due to the combination of convenience, cost, and photo quality. Digital cameras themselves have recently evolved from standalone camera devices to multipurpose mobile devices, such as tablet computers and mobile phones, featuring integrated digital camera functionality. These multipurpose mobile devices make further improvements on user convenience but often lack the photo quality that standalone camera devices offer.

One obstacle preventing multipurpose mobile devices from obtaining higher photo quality is the lack of a convenient method of stabilizing the device in the picture taking process and also for attaching additional accessories, e.g. flash, battery packs, etc. Standalone digital cameras are often used with a standard camera tripod for stabilization and one can also attach high powered flashes and other accessories depending on the application.

Also, most standard camera tripods and accessories are incompatible with multipurpose mobile devices. Accordingly, there is a need for a device for use in stabilizing and for attaching accessories, e.g. flash, battery packs, etc. onto multipurpose mobile devices such as tablets and smart phones for picture and video taking process.

BRIEF SUMMARY OF THE INVENTION

One or more embodiments of the invention are directed a universal phone mounting apparatus. The mounting apparatus comprises a substantially rectangular main clamp with a left and right vertical main post, an inverted v-shaped clamp connecting the top ends of the left and right vertical main posts, and a main clamp handle bar connecting the bottom ends of the left and right vertical main posts.

In one or more embodiments, each one of the left and right main post further comprises a first main post cavity that begins at the top end of the main post and runs towards the bottom end wherein it abuts a smaller second main post cavity at the bottom end of the main post.

In one or more embodiments, each first main post cavity comprises one or more springs. Each spring is preferably a compression spring with a spring cavity through its length.

The mounting apparatus further comprises a bottom clamp with a v-shaped clamp base and a left and right bottom post rising upwards from and coupled to a rear end of the v-shaped clamp base. The left bottom post aligns with the left main post and the right bottom post aligns with the right main post. The height of each of the bottom post depends on the application, i.e. the type of smart device being mounted.

In one or more embodiments, each bottom post further comprises a first bottom post cavity that begins at its top end and runs towards its bottom end wherein it abuts a larger second bottom post cavity.

The mounting apparatus further comprises a pusher. The pusher has a horizontal handle bar at its top and a vertical leg coupled to the bottom side and at opposing ends of the horizontal handle bar. Each vertical leg of the pusher comprises a lower leg portion inside the spring cavity and an upper leg portion seating above the spring. Thus, the upper leg has an outer dimension larger than the spring cavity and serves to compress the spring. The bottom end of the lower leg is removably secured with a nut coupler inside the larger second bottom post cavity while the first bottom post cavity snugly holds the lower leg of the pusher. In one or more embodiments, the bottom end of the lower leg is threaded.

The mounting apparatus further comprises a mounting port at one or more of the perimeters of the main clamp and the base clamp. For instance, each main post, the inverted v-shaped clamp top, the v-shaped clamp base may include a mounting port.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising a universal phone mounting apparatus will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

One or more embodiments of the present invention will now be described with references to FIGS. 1-9.

FIGS. 1, 2A, 2B, and 3 and different views of an embodiment 100 of the universal phone mounting apparatus of the present invention. Device 100 enables a user to attach a smartphone or other smart device 200 to a tripod or other portable stand or handle suitable for stabilizing the smartphone for a particular task, e.g. photography, videography. It should be noted that device 100 may also be used for tablet computers and other mobile devices.

As illustrated, device 100 comprises a bottom clamp 110; a main clamp 120; a pusher 130; one or more springs 150; one or more mounting ports 140 (a-e); and one or more coupler nuts 160. Each spring 150 is a compression spring with an inner cavity (i.e. lumen) through its length. Each spring 150 is configured to fit and be housed inside cavity 127 (FIG. 4A) of the main clamp 120.

Figure 4A:
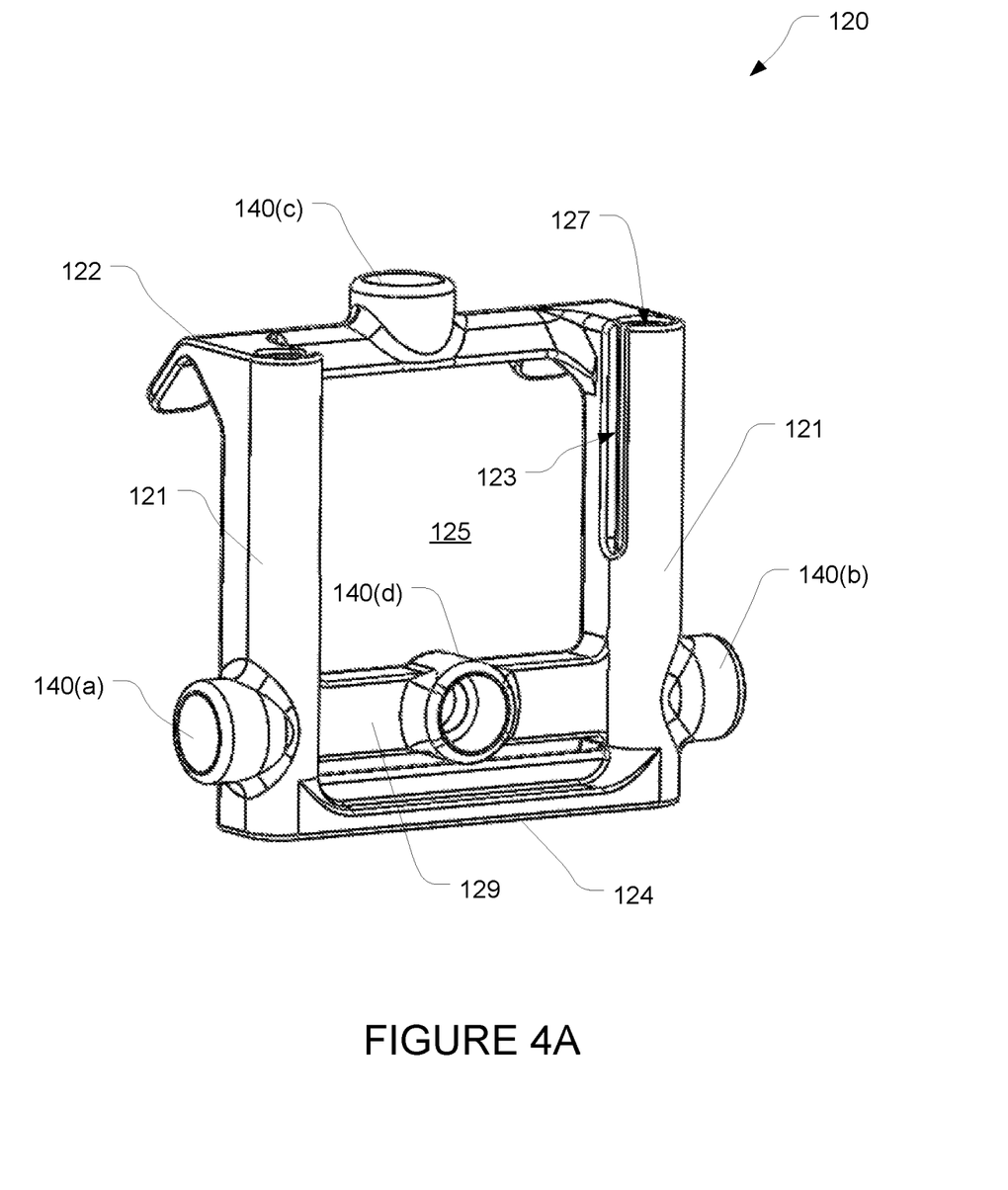
FIG. 4A is a perspective view of the main clamp of the universal phone mounting device in accordance with one or more embodiments of the present invention.
Figure 4B:
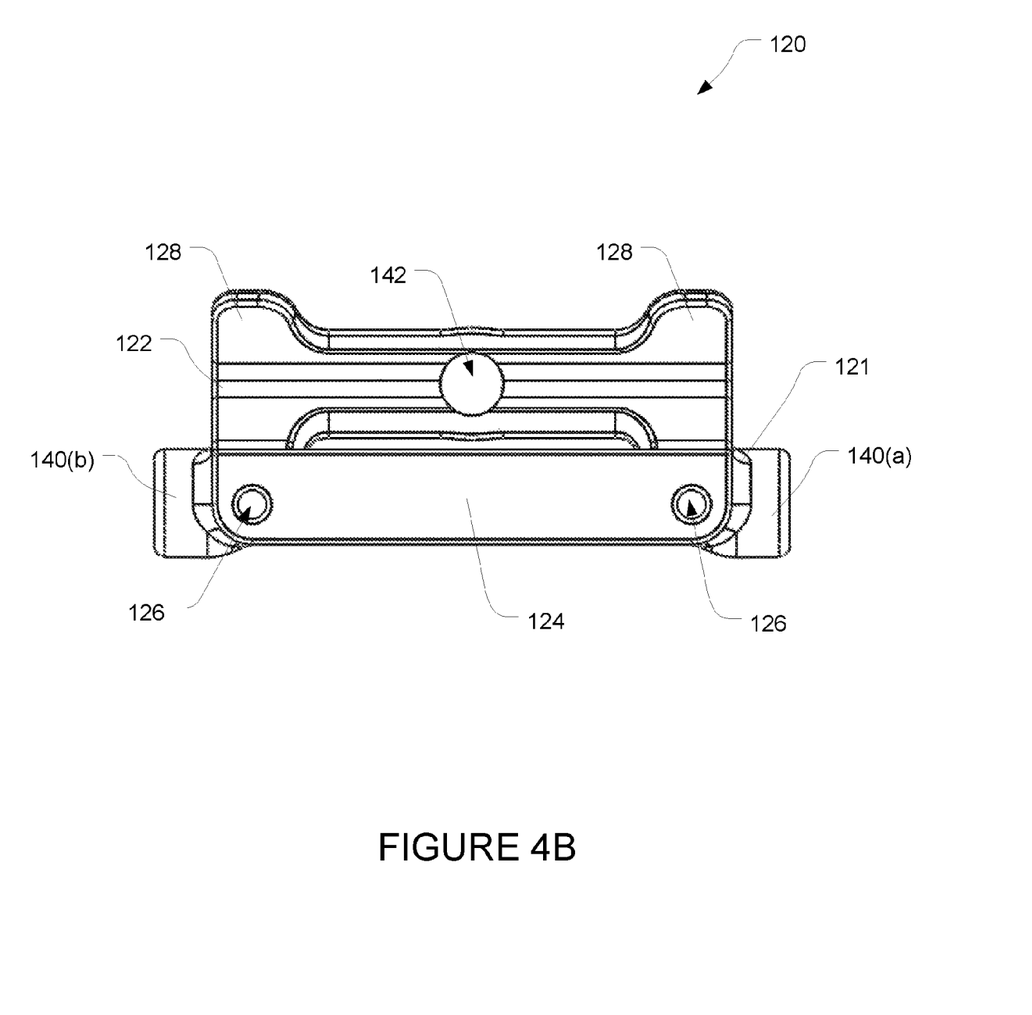
FIG. 4B is a bottom plan view of the main clamp of the universal phone mounting device in accordance with one or more embodiments of the present invention.
Figure 4C:
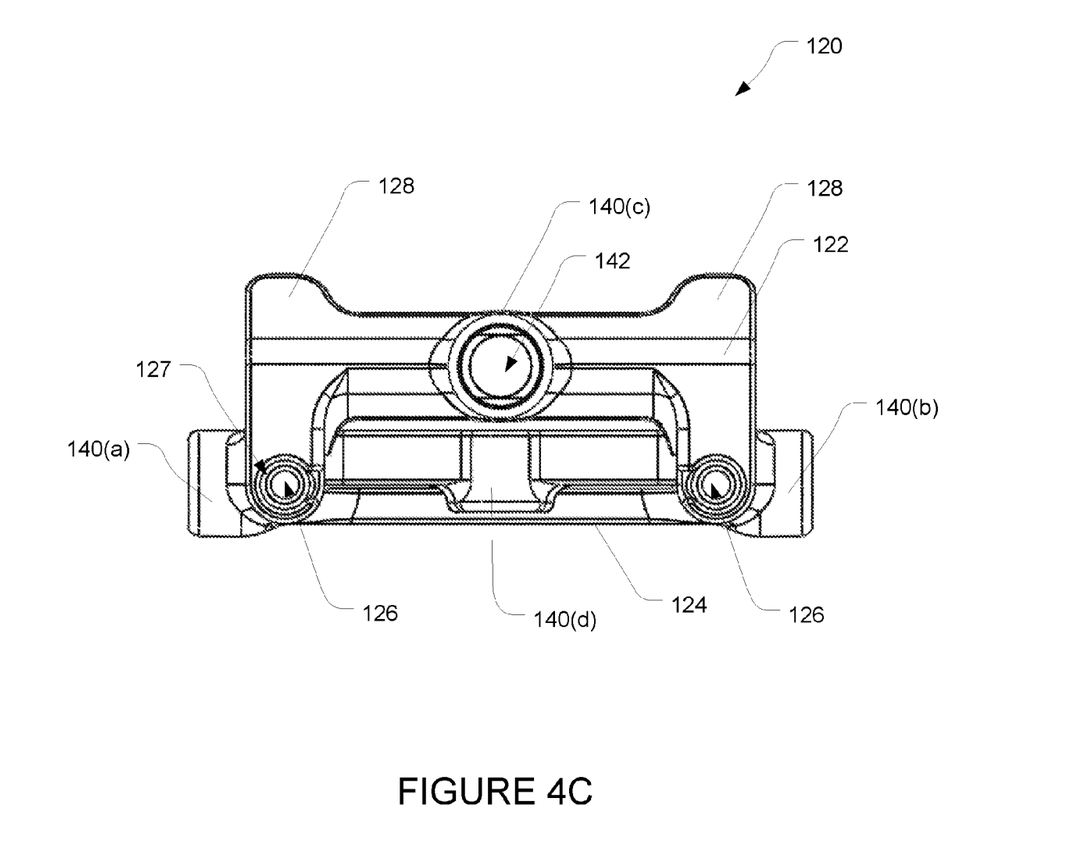
FIG. 4C is a top plan view of the main clamp of the universal phone mounting device in accordance with one or more embodiments of the present invention.

In one or more embodiments, main clamp 120 is a rectangular member with one vertical main post 121 on each side, i.e. left and right, of the main clamp; an inverted v-shaped clamp 122 on the top side; and a horizontal handle 124 on the bottom side. A window 125 is created by the arrangement of the left and right main posts 121, the top clamp 122 and the bottom handle 124. Each main post 121 optionally includes a mounting port 140, e.g. (a) and (b). In one or more embodiments, the inverted v-shaped clamp 122 may also include a mounting port, e.g. 140(c), on its topside and at approximately its geometric center. The topside mounting port 140(c) may be used, for example, to mount the universal mounting device and smart device assembly 600 in an inverted position.

Figure 6A:
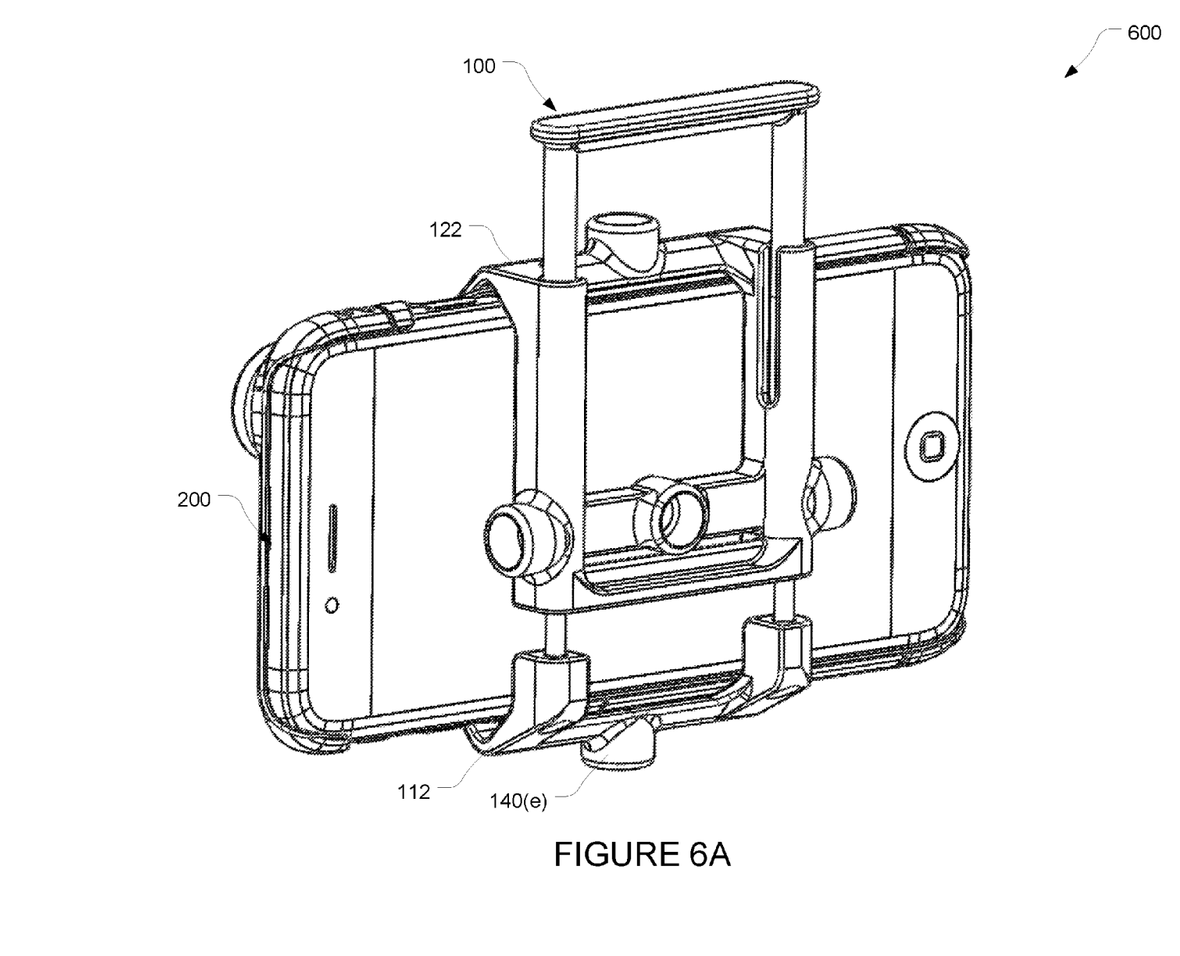
FIG. 6A is a rear perspective view of the universal phone mounting device coupled to a smartphone in accordance with one or more embodiments of the present invention.
Figure 6B:
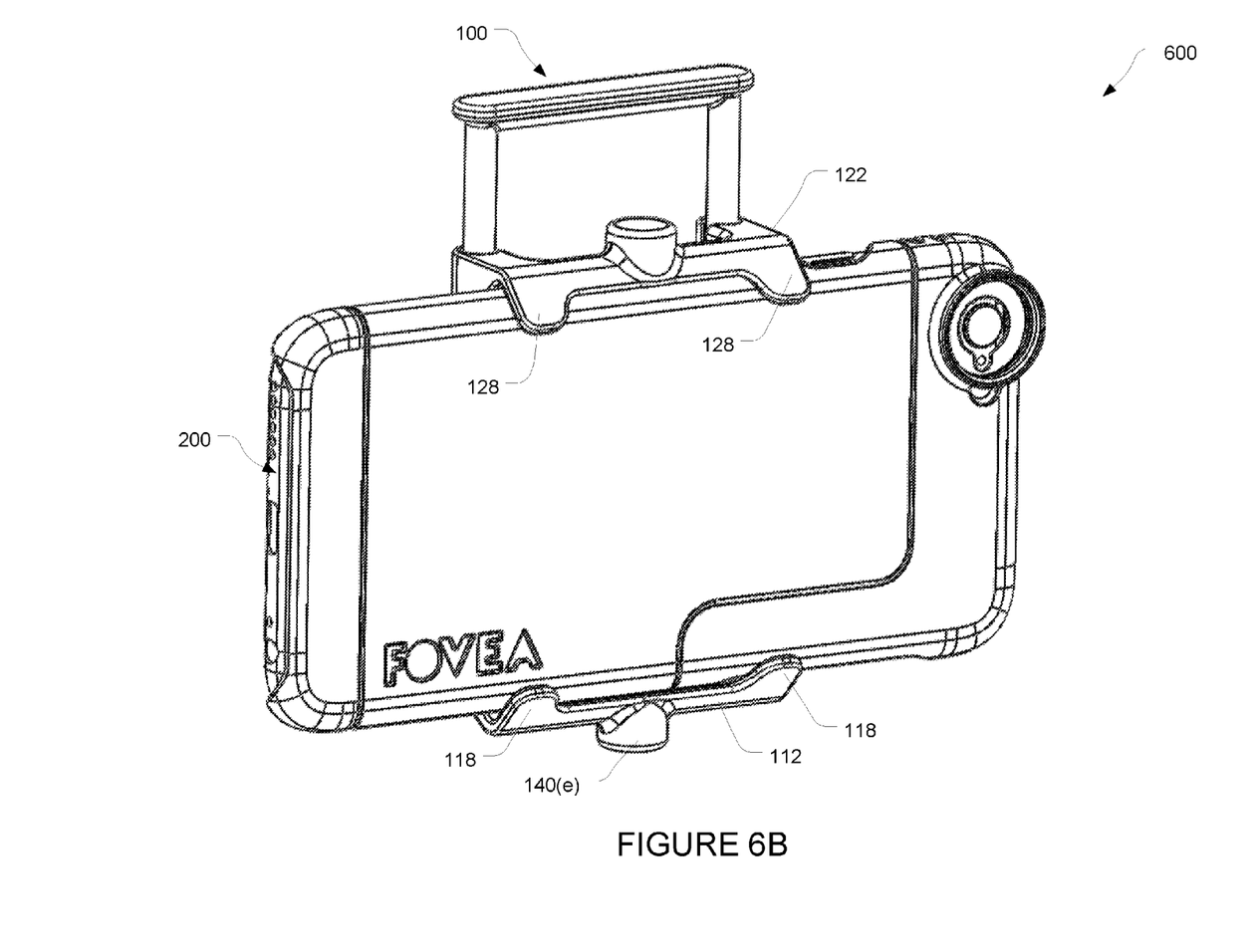
FIG. 6B is a front perspective view of the universal phone mounting device coupled to a smartphone in accordance with one or more embodiments of the present invention.

In one or more embodiments, each inverted v-shaped top clamp 122 comprises one or more fingers 128 at opposing ends. As illustrated in FIGS. 6A and 6B, fingers 128 help secure smart device 200 to device 100 to minimize unintentional uncoupling and the spacing and use of narrow fingers reduces obstructions to the user interfaces of the coupled smart device 200.

Optionally, as illustrated in FIG. 4A, main clamp 120 may further include a horizontal support bar 129 coupled between the left and right main posts 121. Preferably, horizontal support bar 129 abuts the mounting port, if any, on the main post 121, as illustrated. Horizontal support bar 129 may also include a mounting port, e.g. 140(d), on its back or proximal side, at approximately its geometric center.

In one or more embodiments, each main post 121 further comprises a cavity 127 and a slot 123 on its inside wall. Cavity 127 begins at the top of the main post and runs towards the bottom end wherein it abuts a second smaller cavity 126 at the bottom of the main post. Cavity 127 is configured to loosely accommodate and enclose each spring 150 while the top of cavity 126 is configured as a stop for spring 150 but with large enough diameter to fit and allow lower section 136 of pusher 130 to move freely through in an up and down motion.

Figure 9A:
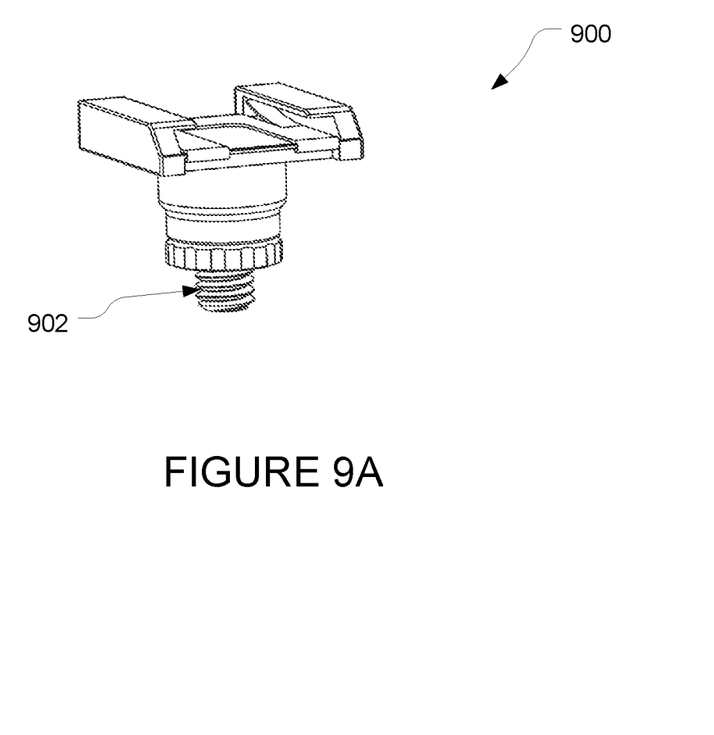
FIG. 9A is a rear perspective view of an accessory shoe adapter for the universal phone mounting device in accordance with one or more embodiments of the present invention.
Figure 9B:
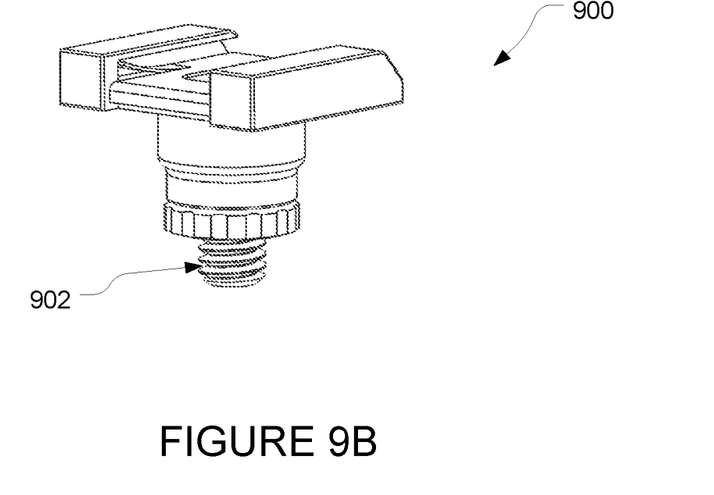
FIG. 9B is a front perspective view of the accessory shoe adapter for the universal phone mounting device in accordance with one or more embodiments of the present invention.

Mounting port 140 (e.g. a-e) further includes at least one orifice, e.g. 142, configured for removably coupling with an adapter 900 for an accessory (e.g. flash, extra battery, etc.), accessory shoe, tripod head, etc. For instance, orifice 142 may comprise a screw thread, e.g. a female threaded receptacle, configured to accept the mounting head thumbscrew of a tripod or threaded section 902 of adapter 900. Also, orifice 142 may be configured without threads but setup such that a nut (not shown) may be used to secure the accessory to the mounting port.

Figure 1:
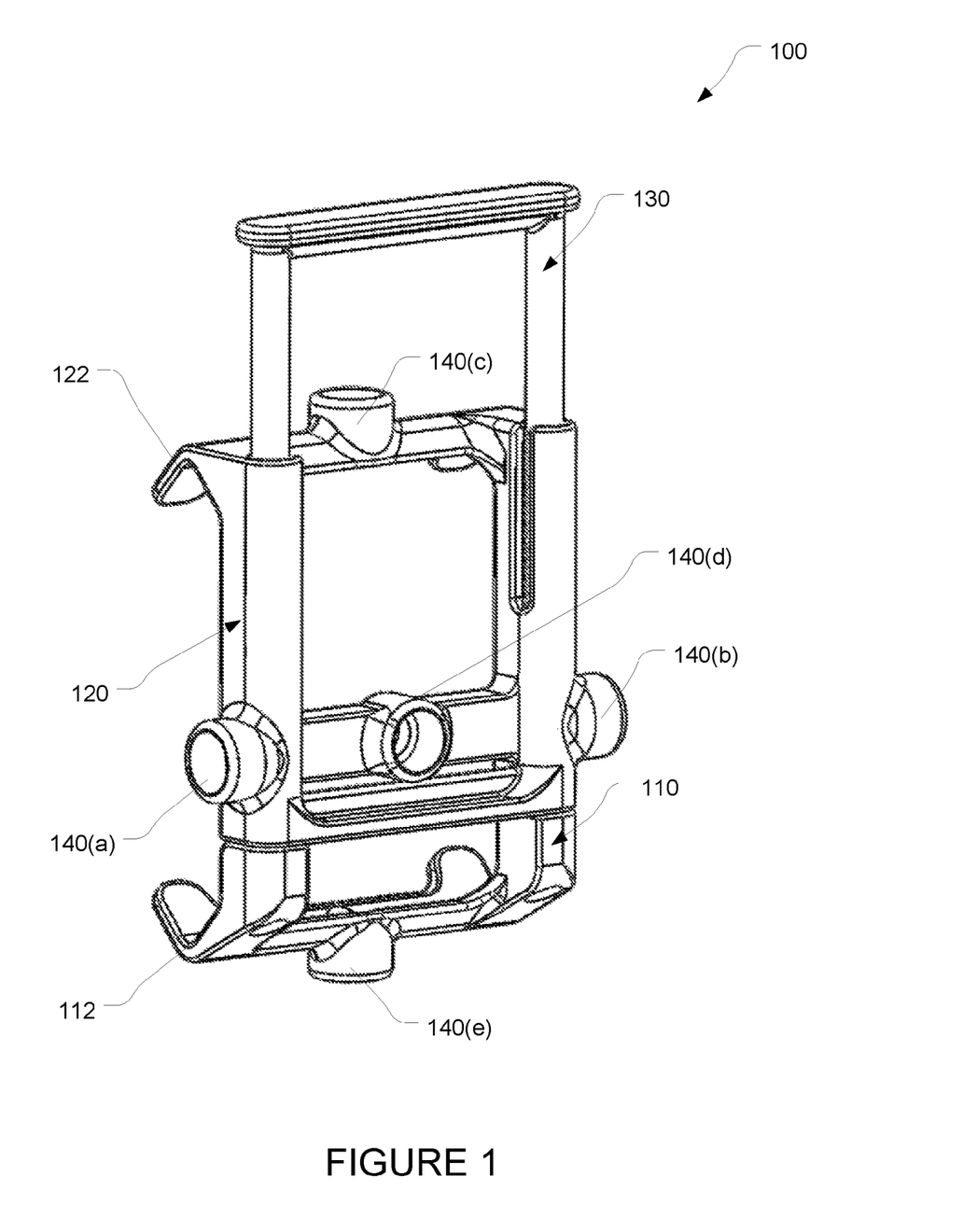
FIG. 1 is a rear perspective view of the universal phone mounting device in a normal state in accordance with one or more embodiments of the present invention.
Figure 2A:
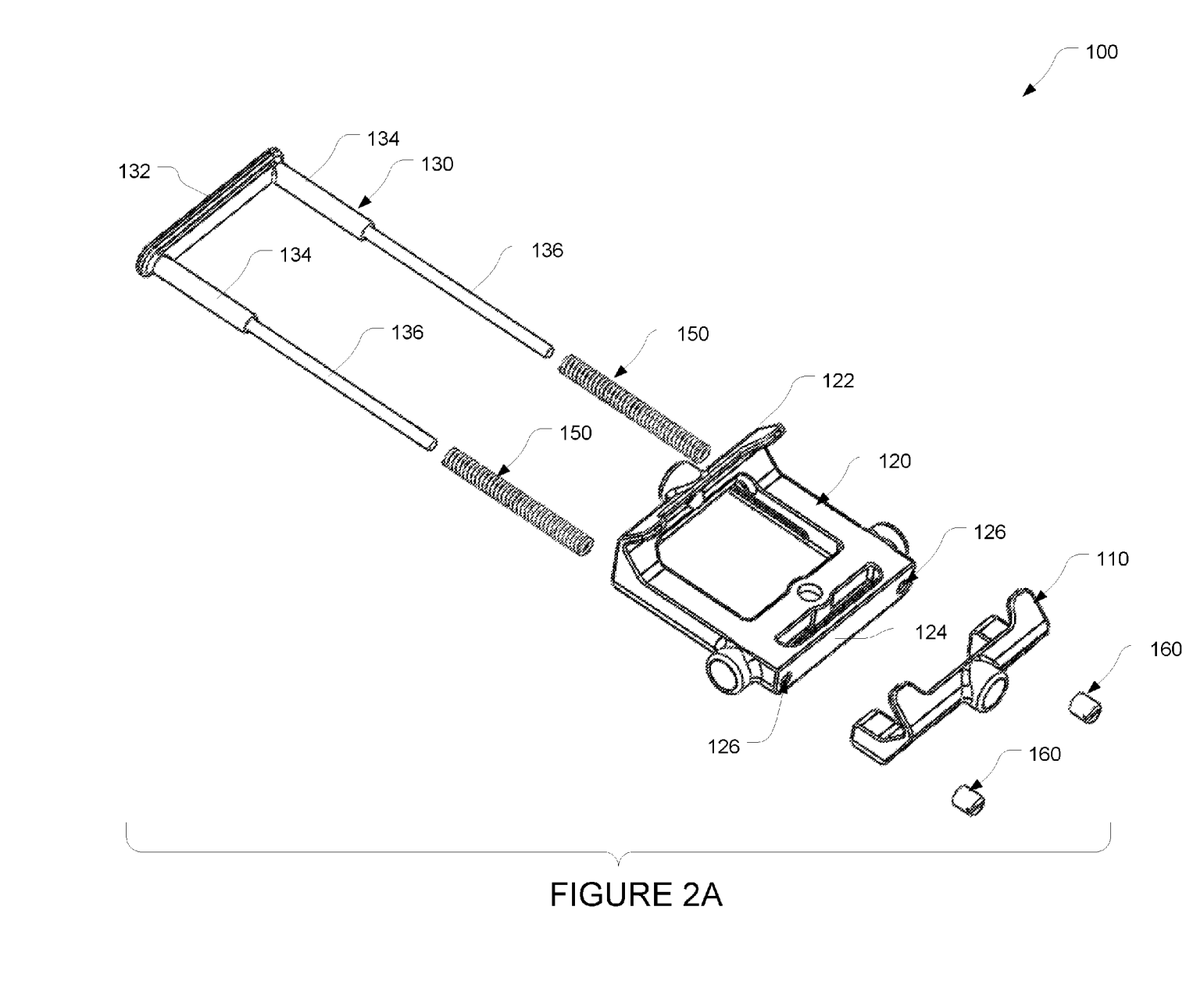
FIGS. 2A-2B are exploded views of the universal phone mounting device in accordance with one or more embodiments of the present invention.
Figure 2B:
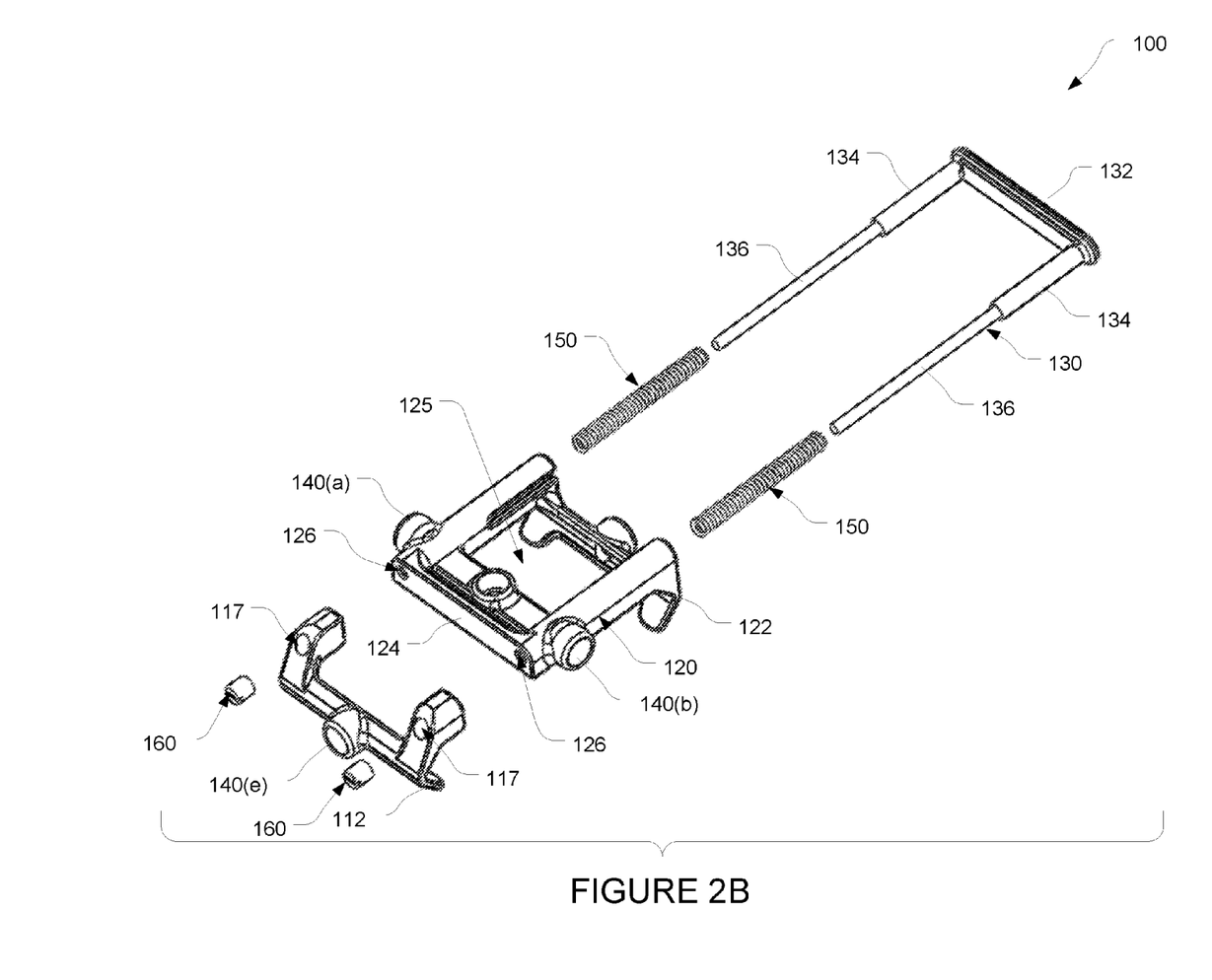

In accordance with one or more embodiments of the present invention, as illustrated in FIGS. 2A and 2B, pusher 130 comprises a horizontal handle bar 132 at its top; and a vertical leg at each end of the handle bar 132 that is coupled to the bottom side of the horizontal handle bar. Each vertical leg comprises a lower section 136 configured to fit inside the lumen of spring 150 and an upper section 134 configured to be larger than the lumen of spring 150. The bottom end of the lower section 136 of each vertical leg may be threaded (not shown) for engaging to a nut coupler, e.g. 160.

Figure 5A:
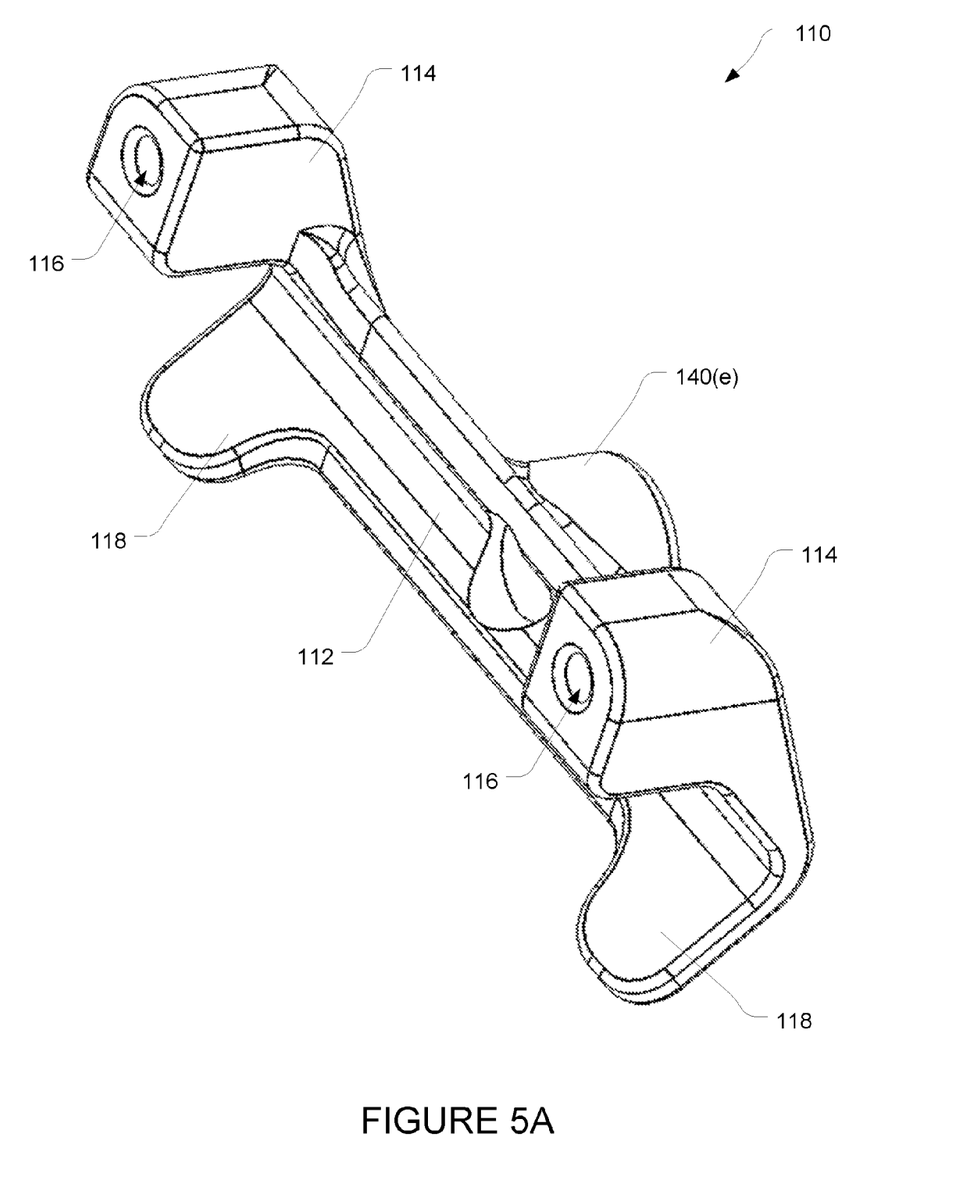
FIG. 5A is a top side perspective view of the base clamp of the universal phone mounting device in accordance with one or more embodiments of the present invention.
Figure 5B:
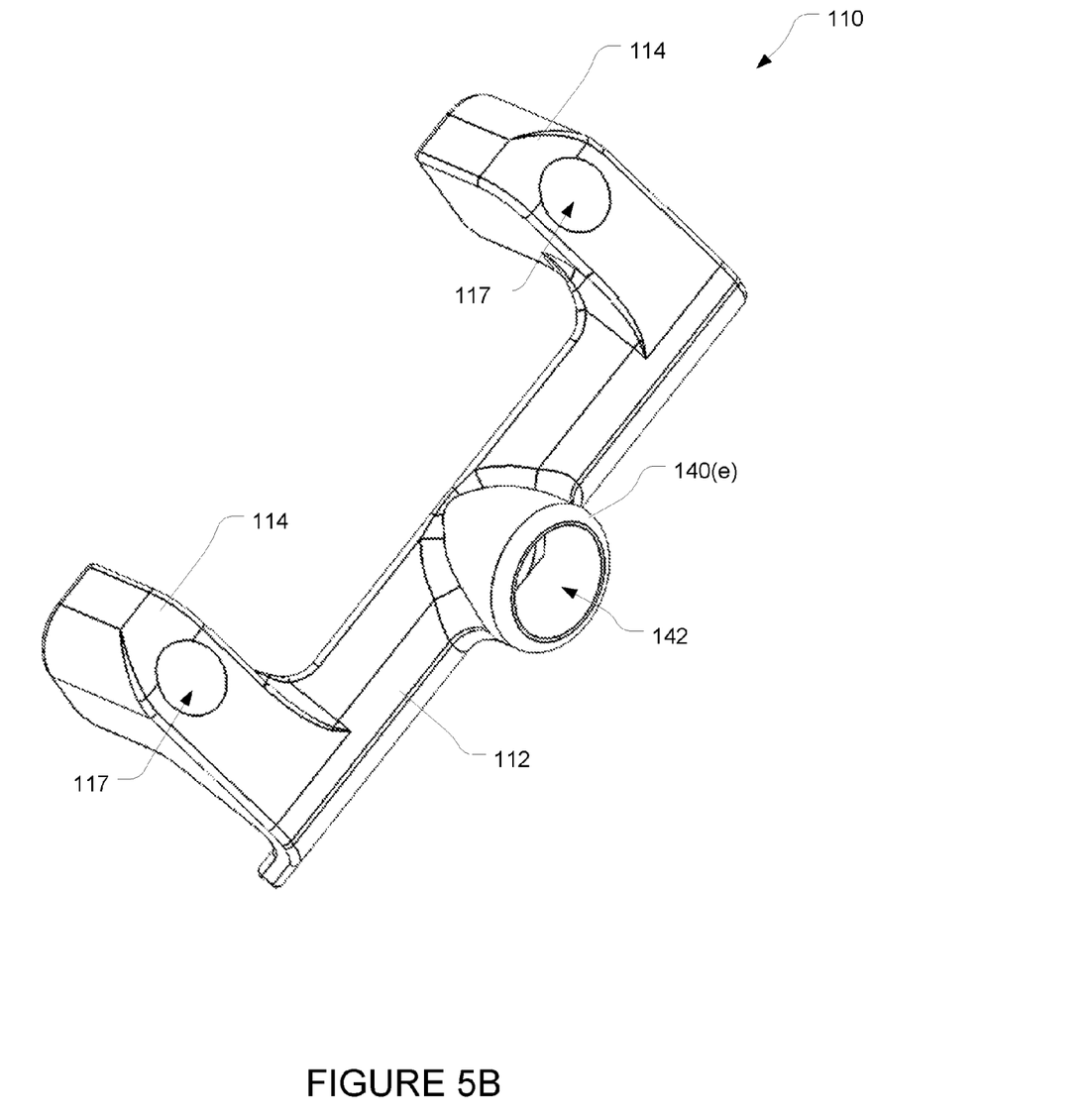
FIG. 5B is a bottom side perspective view of the base clamp of the universal phone mounting device in accordance with one or more embodiments of the present invention.

One or more embodiments of the present invention further includes a bottom clamp 110. As illustrated in FIGS. 5A and 5B, bottom clamp 110 comprises a v-shaped base clamp 112 as a base that is approximately the width, i.e. post to post, of main clamp 120. At opposing ends of the base clamp 112 is a bottom post 114 rising upwards from and coupled to the rear of base clamp 112. The height of the bottom post 114 is dependent on the application of device 100. For instance, it is preferable that when smart device 200 is coupled to device 100, each of the mounting ports 140 on the left (a) and right (b) main posts 121 and the mounting port 140 (d) on the horizontal support bar 129 is approximately at a geometric center of the particular side, for stability.

In one or more embodiments, each bottom post 114 further comprises a cavity 116. Cavity 116 begins at the top of the bottom post 114 and runs towards the bottom end wherein it abuts a second larger cavity 117 at the bottom of the bottom post. Cavity 116 is smaller than cavity 117 and is configured to snugly fit the bottom section 136 of pusher 130 (or 800), i.e. its inside dimension is approximately the same or slightly smaller than the dimension of cavity 126 of the main post 121. Cavity 117 is configured to house nut coupler 160.

In one or more embodiments, each v-shaped base clamp 112 comprises one or more fingers 118 at opposing ends. As illustrated in FIG. 6B, fingers 118 and 128 help secure smart device 200 to minimize unintentional disengagement while also minimizing obstructions to the user interfaces of the coupled smart device 200.

In one or more embodiments, pusher 130 couples together the main clamp 120 and the bottom clamp 110. As illustrated, the lower section 136 of each vertical leg couples through cavity 126 in the main clamp 120 and through cavity 116 in the bottom clamp 110 to engage with a nut coupler 160, thereby completing the assembly.

Figure 7:
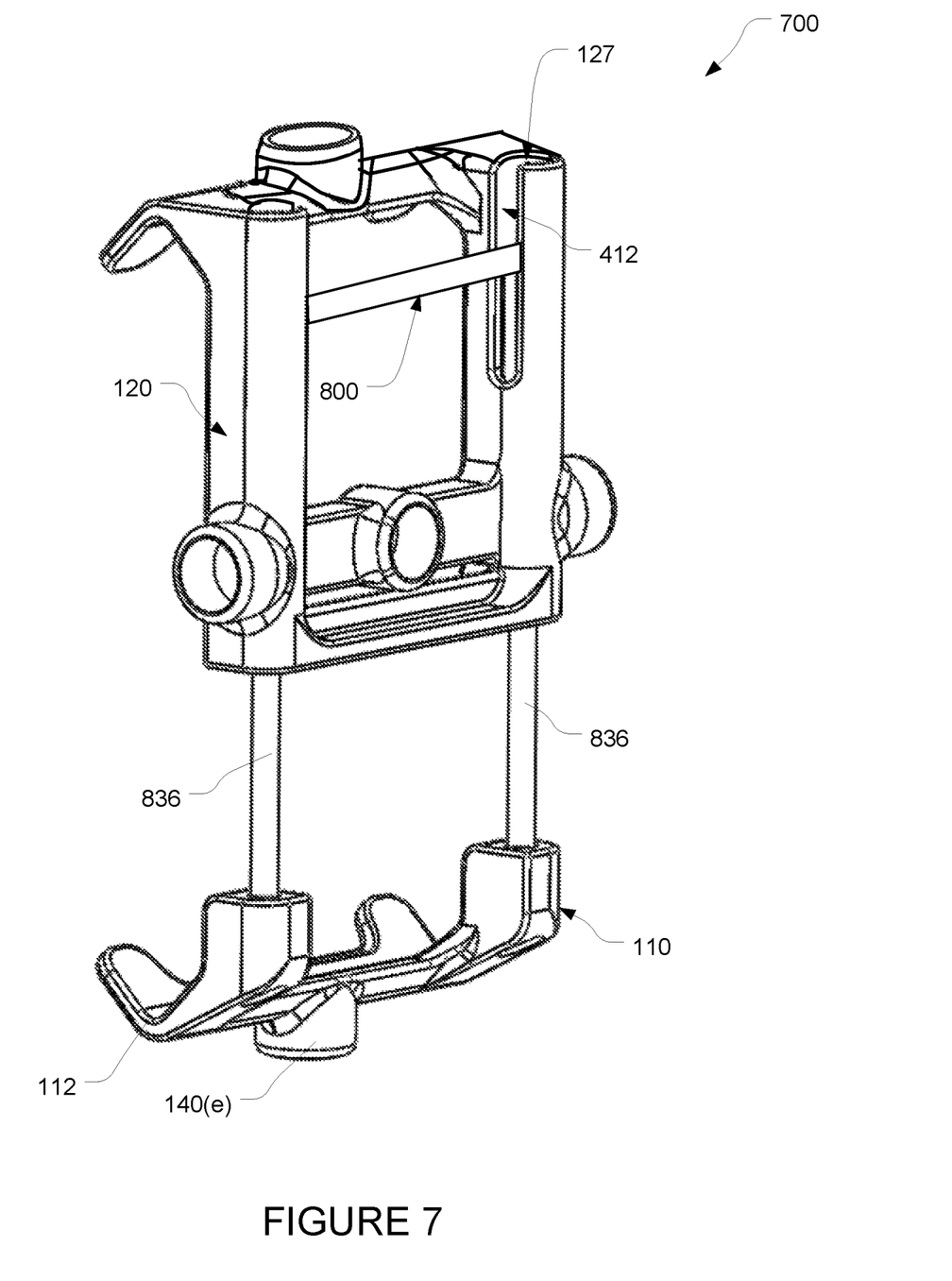
FIG. 7 is a rear perspective view of a second embodiment of the universal phone mounting device in a deployed state in accordance with the present invention.

In one or more embodiments, slot 123 of the main clamp is configured to allow up and down movement, i.e. sliding, of horizontal handle bar 832 of pusher 800 FIG. 7). FIG. 7 is a rear perspective view of a second embodiment of the universal phone mounting device 700 in a deployed state in accordance with the present invention. Slot 123 runs from the top of each main post 121 down to approximately midway the height of the post.

Figure 8:
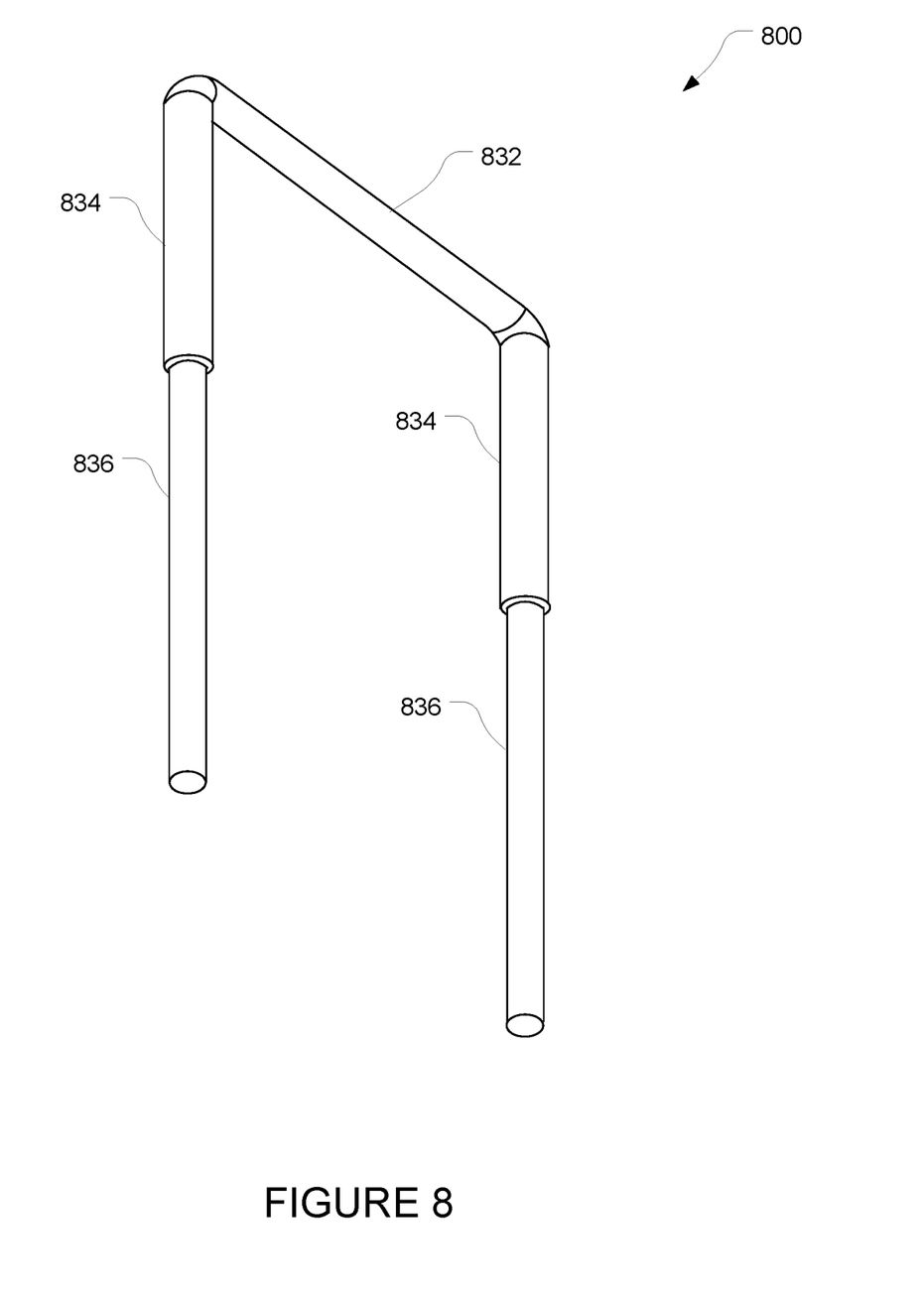
FIG. 8 is a perspective view of the pusher in accordance with the second embodiment of the universal phone mounting device of the present invention.

Configuration 700 of the universal phone mounting device may be advantageous for accommodating larger devices 200 by allowing a longer throw, i.e. wider opening between the base clamp 112 and the top clamp 122, without increasing the footprint of the universal phone mounting device 700. FIG. 8 is a perspective view of pusher 800 in accordance with a second embodiment of the universal phone mounting device of the present invention.

As illustrated, the pusher 800 comprises a horizontal handle bar 832 at its top; and a vertical leg at each end of the handle bar coupled to the bottom side of the horizontal handle bar 832. Each vertical leg comprises a lower section 836 configured to fit inside the lumen of spring 150 and an upper section 834 configured to be larger than the lumen of spring 150. The bottom end of the lower section 836 of each vertical leg may be threaded (not shown) for engaging to a nut coupler, e.g. 160.

Figure 3:
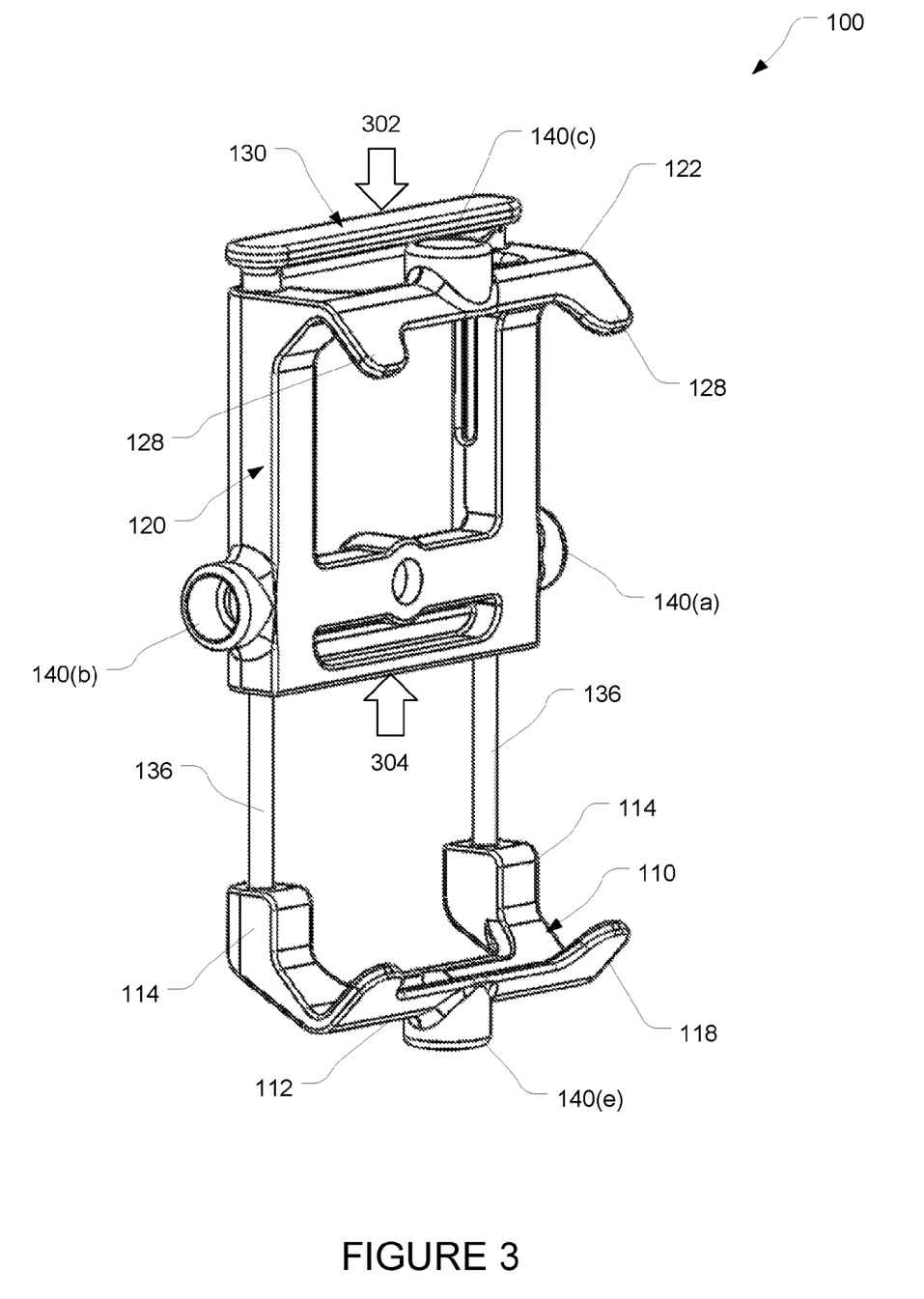
FIG. 3 is a front perspective view of the universal phone mounting device in a deployed state in accordance with one or more embodiments of the present invention.

To operate the device 100, pressure is applied in the direction of arrow 302 (i.e. downward pressure) to the top handle bar, e.g. 132 (or 832), of the pusher 130 (or 800) and simultaneously in the direction of arrow 304 (i.e. upward pressure) to the horizontal handle 124 of main clamp 120, as illustrated in FIG. 3. Thus, the system of the present invention is configured to be operable with one hand as the user can use, for example, the thumb and the middle finger in one hand to open the device, e.g. 100 and 700, in order to attach a smart device 200. As such, the spring rate of spring 150 should be sufficient to allow one handed operation and for the v-shaped clamps, i.e. 112 and 122, to hold smart device 200 securely in place.

Thus, a smart device 200 may be removably placed on the front side of device 100 wherein its secured with clamps 112 and 122 that grabs and holds it at opposing edges. The smart device 200 may be a tablet computer, a mobile phone, or any such mobile device with an integrated digital camera. The full extension of clamps 112 and 122 is preferably configured or configurable to fit the footprint of a target smart device.

In one or more embodiments in accordance with the mounting apparatus 100 described herein, each mounting port 140 (*a-e*) is configured to removably couple to an accessory, accessory shoe, portable stand, etc. The portable stand may be an industry standard tripod or any other such existing device with an attachment head. The portable stand is any device that is suitable for stabilizing a smartphone or similar device for a particular task, e.g. photography, videography, etc. The accessory may be a flash, battery pack, etc.

While the invention herein disclosed has been described by means of specific embodiments and applications thereof, numerous modifications and variations could be made thereto by those skilled in the art without departing from the scope of the invention set forth in the claims.

What is claimed is:

1. A universal phone mounting apparatus comprising:
    a substantially rectangular main clamp with a left and right vertical main post, each main post having a top end and a bottom end, an inverted v-shaped top clamp connecting the top ends of the left and right vertical main posts, and a main clamp handle bar connecting the bottom ends of the left and right vertical main posts, each one of the left and right main post further comprises a first main post cavity that begins at the top end of the main post and runs towards the bottom end wherein it abuts a second smaller main post cavity at the bottom end of the main post;
    one or more springs, wherein at least one of said one or more springs is a compression spring with a spring cavity through its length, wherein one of said one or more springs is housed inside the first main post cavity of the main clamp;
    a bottom clamp comprising a v-shaped base clamp and a left and right bottom post rising upwards from and coupled to a rear end of the v-shaped base clamp, wherein the left bottom post aligns with the left main post and the right bottom post aligns with the right main post, wherein each bottom post further comprises a first bottom post cavity that begins at its top end and runs towards its bottom end wherein it abuts a larger second bottom post cavity;
    one or more nut couplers;
    a pusher having a horizontal handle bar at its top and a vertical leg coupled to a bottom side at each opposing end of the horizontal handle bar, wherein the vertical leg comprises a lower leg inside the spring cavity and an upper leg above the spring and configured to compress the spring, wherein the upper leg has an outer dimension larger than the spring cavity, wherein the lower leg of the pusher is removably coupled to the bottom clamp with one of the one or more nut couplers inside the second bottom post cavity; and
    a mounting port at one or more of the perimeters of the main clamp and the bottom clamp.

2. The universal phone mounting apparatus of claim 1, wherein the lower leg's bottom end is threaded for removably coupling with said one of the one or more nut couplers.

3. The universal phone mounting apparatus of claim 1, wherein a camera accessory is removably coupleable to said mounting port.

4. The universal phone mounting apparatus of claim 1, wherein a tripod is removably coupleable to said mounting port.

5. The universal phone mounting apparatus of claim 1, wherein a height of the bottom post is dependent on a size of a smart device to be secured between said top clamp and said bottom clamp.

6. A universal phone mounting apparatus comprising:
a main clamp with a left and right vertical main post, each main post having a top end and a bottom end, an inverted v-shaped top clamp connecting the top ends of the left and right vertical main posts, and a main clamp handle bar connecting the bottom ends of the left and right vertical main posts, each one of the left and right main post further comprises a first main post cavity that begins at the top end of the main post and runs towards the bottom end wherein it abuts a second smaller main post cavity at the bottom end of the main post;
one or more compression springs inside the first main post cavity of the main clamp, wherein at least one of said one or more springs has a spring cavity through its length;
a bottom clamp comprising a v-shaped base clamp and a left and right bottom post rising upwards from and coupled to a rear end of the v-shaped clamp base;
a pusher having a horizontal handle bar at its top and a vertical leg coupled to a bottom side at opposing ends of the horizontal handle bar, wherein each vertical leg comprises a lower leg inside the spring cavity and an upper leg above the spring, wherein the upper leg has an outer dimension larger than the spring cavity, and wherein the lower leg's bottom end is removably secured to said bottom clamp with one or more nut couplers; and
a mounting port at one or more of the perimeters of the main clamp and the bottom clamp.

7. The universal phone mounting apparatus of claim 6, wherein the left bottom post aligns with the left main post and the right bottom post aligns with the right main post.

8. The universal phone mounting apparatus of claim 6, wherein a camera accessory is removably coupleable to said mounting port.

9. The universal phone mounting apparatus of claim 6, wherein a tripod is removably coupleable to said mounting port.

10. A universal phone mounting apparatus comprising:
a main clamp with a left and right vertical main post;
a compression spring housed inside a cavity in each of the left and right main posts;
a bottom clamp comprising a v-shaped base clamp;
a pusher removably secured to said bottom clamp through said compression spring in said main clamp; and
a plurality of mounting ports, wherein at least one of said plurality of mounting ports is located at one or more of the perimeters of the main clamp and the bottom clamp.

11. The universal phone mounting apparatus of claim 10, wherein each of said left and right main post has a top end and a bottom end, and the main clamp further comprises an inverted v-shaped top clamp connecting the top ends of the left and right vertical main posts, and a main clamp handle bar connecting the bottom ends of the left and right vertical main posts.

\* \* \* \* \*